United States Patent [19]
Okabe et al.

[11] 3,763,344

[45] Oct. 2, 1973

[54] INDUSTRIAL ROBOT WITH A WELDING GUN

[75] Inventors: Yoshio Okabe, Kawasaki; Kenji Yamane, Akashi-shi, both of Japan

[73] Assignee: Kawasaki Jukogyo Kabushiki Kaisha, Hyogo, and Dengenska Manufacturing Co., Ltd., Kanagawa, both of Japan

[22] Filed: July 10, 1972

[21] Appl. No.: 270,429

[52] U.S. Cl. .................. 219/116, 174/69, 339/9 R
[51] Int. Cl. ................... B23k 11/24, H01r 41/00
[58] Field of Search .................. 174/69; 219/108, 219/116; 338/128, 133; 339/9 R, 9 E

[56] References Cited
UNITED STATES PATENTS
2,697,157  12/1954  Kersta .......................... 174/69 X

*Primary Examiner* — R. F. Staubly
*Attorney* — Richard C. Sughrue et al.

[57] ABSTRACT

An industrial robot having a base, a welding body supported on the base, a reciprocating, movable arm supported by the welding body, and a welding gun supported on the outer end of the arm. The welding transformer is secured to the stationary welding body and is provided with a pair of secondary conductors extending parallel to each other and the arm. A pair of current conducting plates are secured to the arm and connected to the ends of a pair of conductors connected to the gun. The pair of current conducting plates slidably contact the pair of secondary conductors. One of the pair of secondary conductors is connected to the welding transformer such that the impedance in conducting the welding current through the current conducting plate, in sliding contact therewith, is reduced as the arm is moved away from the transformer, while the other secondary conductor is connected to the transformer such that the impedance is increased as the arm is moved away from the transformer. The resultant impedance of the secondary conductors is thereby held constant regardless of the movement of the arm during the welding operation.

6 Claims, 2 Drawing Figures

INDUSTRIAL ROBOT WITH A WELDING GUN

BACKGROUND OF THE INVENTION

1. Field of the Invention

The present invention relates to an industrial robot having a welding gun.

2. Description of the Prior Art

An industrial robot is a kind of manipulator capable of freely actuating mechanically an operating arm so as to carry out the desired operation.

The term "robot" is used throughout the specification in referring to the manipulator as described above.

A conventional robot for welding is provided with a welding gun which is handled manually by an operator as a portable gun. The prior art robot having a welding gun is usually supplied with welding current from a welding transformer suspended from the ceiling of the factory through a flexible and relatively heavy cable.

Since the transformer is suspended from the ceiling, it tends to swing and the flexible cable is heavy because of the cooling water tube provided therein to prevent the cable from being heated by the large welding current through the cable. The movement of the robot is disturbed by the swinging movement of the transformer and the cable as the robot is actuated. The difficulty in movement results in inaccurate operation of the robot as well as the damage to the cable, although the robot is very powerful.

The present invention aims at avoiding the above described disadvantages of the prior art robot for welding.

SUMMARY OF THE INVENTION

The object of the present invention is to provide a novel and useful industrial robot for welding which avoids the above described disadvantages of the prior art welding robot.

The above object is achieved in accordance with the present invention by provision of a robot having a base and a welding body supported on the base. A reciprocating movable arm supported by the welding body moves away and toward the welding body, and a welding gun is provided at the outer end of the arm. The robot is characterized by a welding transformer secured to the welding body for supplying welding current to the gun, a pair of secondary conductors, provided in the transformer and extending therefrom parallel to the direction of movement of the arm, and a pair of current conducting plates secured to the arm and slidably contacting the secondary conductors. The pair of current conducting plates are connected to the ends of a pair of conductors connected to the welding gun. One of the pair of secondary conductors is connected to the transformer such that the impedance thereof is increased as the arm is moved away from the transformer while the other secondary conductor is connected to the transformer such that the impedance is reduced as the arm is moved away from the transformer. Thus, the welding current is supplied from the transformer to the gun without varying the impedance between the transformer and the gun, regardless of the movement of the arm and without causing any swinging movement of the transformer and the conductors, thereby insuring the stable and accurate operation of the welding gun.

In one form of the present invention, the pair of secondary conductors extends away from the transformer parallel to the arm, one end of each conductor being connected to the secondary of the transformer. One of the secondary conductors has a bent portion at its distal free end, bent back upon itself to form a U-shape as the bent portion extends back towards the transformer parallel to the arm. One of the pair of current conducting plates contacts one secondary conductor as it extends from the transformer while the other plate contacts the bent portion of the other secondary conductor, thereby maintaining the resultant impedance constant regardless of the movement of the arm.

In another form of the present invention, the pair of secondary conductors extend parallel to the direction of movement of the arm. The proximal end of one of the pair of secondary conductors is connected to the secondary of the transformer while the distal end of the other secondary conductor is connected to the secondary of the transformer so that the impedance to the welding current of the one secondary conductor is increased as the arm is moved away from the transformer whereas the impedance to the welding current of the other secondary conductor is reduced as the arm is moved away from the transformer, thereby maintaining the resultant impedance constant regardless of the movement of the arm.

DESCRIPTION OF THE PREFERRED EMBODIMENT

Figure 1:
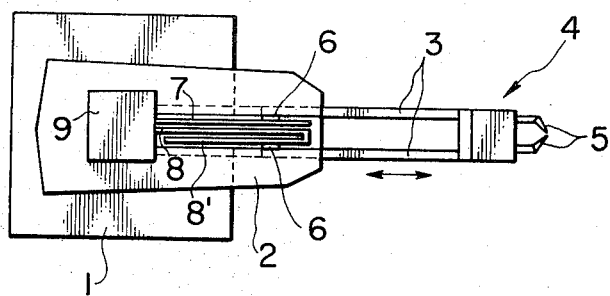
FIG. 1 is a plan view schematically showing the general arrangement of an embodiment of the robot for spot welding constructed in accordance with the present invention.
Figure 2:
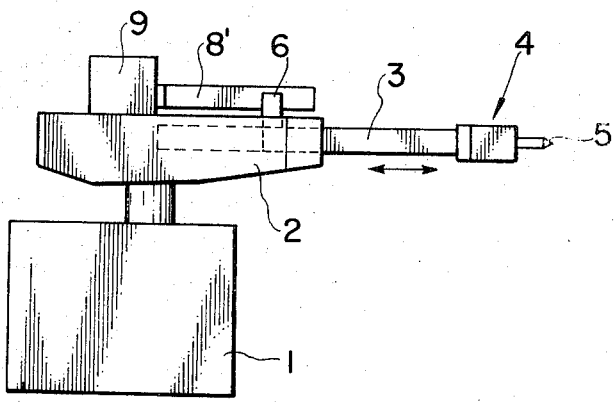
FIG. 2 is a side view showing the embodiment of FIG. 1.

Referring to the drawings showing a robot for spot welding in accordance with the present invention, the robot includes a base 1, a welding body 2 supported by the base 1, and at least one arm 3 (two arms 3, 3 being shown in FIG. 1) supported by the welding body 2 in a reciprocating movable manner so as to be moved toward and away from the body 2 as indicated by the arrow shown in FIGS. 1 and 2. A welding gun 4, secured to the outer ends of the arm 3, is provided with a pair of welding electrodes 5 for spot welding.

In accordance with the feature of the present invention, a welding transformer 9 is secured to the welding body 2 and is supplied with electric power by a cable (not shown). The transformer 9 is provided with a pair of secondary conductors 7 and 8 secured to the transformer 9 and connected respectively to the secondary of the transformer 9. The secondary conductor 7 extends straight from the transformer 9 parallel to the direction of movement of the arms 3 while the other secondary conductor 8 has a bent portion 8' at its outer end bent back upon itself to form a U-shape. The bent portion 8' extends back towards the transformer 9 parallel to the direction of movement of the arms 3.

A pair of current conducting plates 6, 6 are secured to the proximal ends of the arms 3, respectively, and the current conducting plates 6, 6 are connected through a pair of conductors (not shown) to the electrodes 5, 5, respectively. The current conducting plates 6, 6 slidably contact with the secondary conductor 7 and the bent portion 8' of the secondary conductor 8, respectively, so that the welding current is supplied to the welding electrodes 5, 5 through the secondary conductors 7, 8 and the current conducting plates 6, 6 regardless of the movement of the arms 3.

The impedance characteristics per unit length of the secondary conductor 7 is made to be the same as those of the secondary conductor 8.

Therefore, when the arms 3 move away from the transformer 9, the impedance of the secondary conductor 7 is increased, while the impedance of the secondary conductor 8 is reduced by the same amount as the increase in impedance in the secondary conductor 7. Thus, the resultant impedance is kept constant. In like manner, the impedance of the secondary conductor 7 is reduced while the impedance of the secondary conductor 8 is increased, by the same amount as the reduction in the impedance of secondary conductor 7, as the arms 3 are moved toward the transformer 9. Thus, the welding condition is held unchanged regardless of the movement of the arms 3.

It is preferable to provide electrically insulated material between the secondary conductors 7 and 8, as well as in the inner space of the U-shape formed by the proximal portion of the secondary conductor 8 and the bent portion 8'.

Also, a cover member may be secured to the welding body over the secondary conductors 7 and 8 and the current conducting plates 6, 6 so as to protect them from the exterior.

Alternatively, the transformer 9, the secondary conductors 7 and 8, and the current conducting plates 6, 6 may be housed within the welding body 2 per se.

In accordance with another feature of the present invention, a pair of secondary conductors of the same impedance characteristics per unit length may be secured to the transformer 9 extending parallel to the arms 3, although not illustrated in the drawings. The proximal end of one of the secondary conductors is connected to the secondary of the transformer 9, while the other secondary conductor is connected at its distal end to the secondary of the transformer 9. The current conducting plates directly slidingly contact the respective secondary conductors.

Therefore, as the arms 3 move away from the transformer 9, the impedance of the one secondary conductor increases while the impedance of the other secondary conductor is decreased by the same amount, and vice versa, thereby permitting the resultant impedance to be kept constant. Thus, the welding condition is held unchanged regardless of the movement of the arms 3.

As described above, in accordance with the present invention, the heretofore required long heavy cable which tends to swing during the welding operation can be dispensed with by virtue of the welding transformer 9 fixedly secured to the stationary welding body 2 insuring the stable and safe operation. Furthermore, the welding condition is held unchanged by virtue of the provision of the secondary conductors and the current conducting plates capable of cancelling the variation in impedance in the respective secondary conductors during the movement of the arms.

While the invention has been particularly shown and described with reference to the preferred embodiments thereof, it will be understood by those skilled in the art that various changes in form and details may be made therein without departing from the spirit and scope of the invention.

We claim:

1. In an industrial robot having a base; a welding body supported on said base; at least one arm supported by said welding body for reciprocating movement towards and away from said welding body; a welding gun supported at the outer end of said arm; a welding transformer; and a pair of secondary conductor means connected between said welding transformer and said welding gun for supplying welding current from said welding transformer to said welding gun, the improvement wherein said welding transformer is secured to said welding body and said pair of secondary conductor means extend from said transformer parallel to said arm wherein each of said secondary conductor means has the same impedance characteristics per unit length, and said arm includes a pair of current conducting plate means secured thereto, said pair of current conducting plate means slidably contacting with said pair of secondary conductor means such that each plate means contacts a corresponding secondary conductor means, one of said pair of secondary conductor means being connected to said welding transformer such that the impedance thereof is reduced as said arm moves away from said welding body, and the other of said pair of secondary conductor means is connected to said welding transformer such that the impedance thereof is increased as said arm moves away from said welding body.

2. The industrial robot according to claim 1, wherein one of said pair of secondary conductor means extends from said transformer parallel to the other secondary conductor means and said arm and the other of said pair of secondary conductor means has a bent portion bent back upon itself to form a U-shape extending toward said welding transformer parallel to the secondary conductor means, and wherein said pair of current conducting plate means slidably contact said one secondary conductor means and said bent portion of said other secondary conductor means.

3. The industrial robot according to claim 1, wherein said pair of secondary conductor means extend from said welding transformer parallel to each other and said arm, one of said pair of secondary conductor means being connected to said welding transformer at its end adjacent to said transformer and the other of said pair of secondary conductor means being connected to said transformer at its end remote from said transformer.

4. The industrial robot according to claim 1, further including electrical insulating material between said pair of secondary conductor means.

5. The industrial robot according to claim 1, wherein said welding transformer, said pair of secondary conductor means and said pair of current conducting plate means are housed in said welding body.

6. The industrial robot according to claim 1, further including a cover means, secured to said welding body, for covering said pair of secondary conductor means and said current conducting plate means.

* * * * *